(12) United States Patent
Coppage et al.

(10) Patent No.: US 8,559,415 B2
(45) Date of Patent: Oct. 15, 2013

(54) METHOD AND APPARATUS FOR FACILITATING TELECOMMUNICATION NETWORK SELECTION

(75) Inventors: Carl M. Coppage, Kansas City, MO (US); John M. Heinz, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1149 days.

(21) Appl. No.: 11/904,897

(22) Filed: Sep. 28, 2007

(65) Prior Publication Data

US 2009/0086718 A1   Apr. 2, 2009

(51) Int. Cl.
*H04L 12/66* (2006.01)

(52) U.S. Cl.
USPC .................. 370/352; 455/411; 455/456.1

(58) Field of Classification Search
USPC ............ 370/351, 352, 252, 338, 395.5; 455/552.1, 445, 432.1, 558; 707/3; 717/120; 1/1; 709/217; 379/201.01
See application file for complete search history.

(56) References Cited

U.S. PATENT DOCUMENTS

| | | | |
|---|---|---|---|
| 6,532,490 B1 * | 3/2003 | Lewis et al. ................. | 709/217 |
| 6,597,686 B1 * | 7/2003 | Smyk .......................... | 370/352 |
| 7,092,380 B1 * | 8/2006 | Chen et al. .................. | 370/352 |
| 7,171,233 B2 * | 1/2007 | Sanchez ..................... | 455/552.1 |
| 7,263,360 B2 * | 8/2007 | Naeini et al. ............... | 455/445 |
| 7,333,505 B2 | 2/2008 | Yoakum et al. | |
| 7,356,023 B2 | 4/2008 | Lowmaster | |
| 7,630,965 B1 * | 12/2009 | Erickson et al. ............ | 1/1 |
| 7,839,992 B2 | 11/2010 | Croak et al. | |

| | | | |
|---|---|---|---|
| 2002/0080751 A1 * | 6/2002 | Hartmaier ................... | 370/338 |
| 2004/0249984 A1 | 12/2004 | Das et al. | |
| 2005/0064894 A1 | 3/2005 | Kusnitz et al. | |
| 2005/0089018 A1 | 4/2005 | Schessel | |
| 2005/0105706 A1 * | 5/2005 | Kokkinen ................... | 379/201.01 |
| 2005/0131870 A1 * | 6/2005 | Krishnaswamy et al. ...... | 707/3 |
| 2006/0085824 A1 | 4/2006 | Bruck et al. | |
| 2006/0161892 A1 * | 7/2006 | Anand et al. ................ | 717/120 |
| 2006/0205434 A1 * | 9/2006 | Tom et al. ................... | 455/558 |
| 2007/0076691 A1 * | 4/2007 | Varney et al. ............... | 370/352 |
| 2007/0242619 A1 * | 10/2007 | Murakami et al. ........... | 370/252 |
| 2007/0254646 A1 * | 11/2007 | Sokondar ................... | 455/432.1 |

(Continued)

FOREIGN PATENT DOCUMENTS

| CN | 101330733 | * 6/2007 |
|---|---|---|
| CN | 101330733 | 12/2008 |

OTHER PUBLICATIONS

U.S. Appl. No. 12/111,472—Non-Final Office Action dated Nov. 2, 2011.

(Continued)

*Primary Examiner* — Asad Nawaz
*Assistant Examiner* — Parth Patel
(74) *Attorney, Agent, or Firm* — Patton Boggs LLP (57) ABSTRACT

A method, apparatus, and computer usable program product for facilitating a selection of a telecommunication network are provided. A request for a type of network associated with a called identifier is received from a calling communication device. A repository of information about caller identifiers is searched. Information corresponding to the called identifier is selected. The selected information includes the type of network associated with the called identifier. The selected information is returned to the calling communication device. The information in the repository is updated by adding information about new caller identifiers, updating information about the several caller identifiers existing in the repository, or both.

11 Claims, 4 Drawing Sheets

(56) References Cited

U.S. PATENT DOCUMENTS

2008/0020777 A1* 1/2008 Zhang et al. .................. 455/445
2008/0056272 A1* 3/2008 Batta .......................... 370/395.5
2008/0112551 A1 5/2008 Forbes et al.
2011/0026515 A1 2/2011 Jacobsohn et al.

OTHER PUBLICATIONS

U.S. Appl. No. 12/111,549—Non-Final Office Action Dated Nov. 9, 2011.

U.S. Appl. No. 11/904,897—Non-Final Office Action Dated Jul. 6, 2011.

U.S. Appl. No. 11/904,897—Final Office Action Dated Dec. 1, 2011.

U.S. Appl. No. 11/904,698—Non-Final Office Action Dated Mar. 14, 2011.

U.S. Appl. No. 11/904,698—Final Office Action Dated Oct. 18, 2011.

* cited by examiner

METHOD AND APPARATUS FOR FACILITATING TELECOMMUNICATION NETWORK SELECTION

BACKGROUND

1. Field of the Invention

The principles of the present invention relate generally to an improved telecommunication system, and in particular, to using networks for telecommunication. Still more particularly, the principles of the present invention relate to a method, apparatus, and computer usable program product for facilitating a telecommunication network selection.

2. Description of the Related Art

Telecommunication involves two or more communication devices communicating with each other using a communication network. For example, two telephones may be able to communicate with each other using a telecommunication network called public switched telephone network (PSTN). PSTN is primarily a voice telecommunication network for enabling telephone-based telecommunication between two or more parties.

A "caller telephone" or a "calling telephone" is a telephone from which a voice call is placed. A "called telephone" is a telephone on which a voice call is received. A "caller party" or a "calling party" is an individual or a party who places a voice call. A "called party" is an individual or party who receives a voice call. A "caller number" or a "calling number" is a telephone number from which a voice call is placed. A "called number" is a telephone number on which a voice call is received. A called number is also called a "called telephone number".

Similarly, a "caller communication device" or a "calling communication device" is a communication device from which a telecommunication call is placed; and a "called communication device" is a communication device on which a telecommunication call is received. The term "communication devices" refers to the collection of all devices used for telecommunication. For example, a communication device can be the familiar telephone, a computer with a telecommunication enabling software application, a telephone like device that works over data networks instead of plain old telephone system (POTS) line, a wireless or cellular phone, or any other device used for telecommunication. A communication device is any one of these communication devices. Communication devices may also include devices and applications capable of communicating in other ways, for example, by text messaging, instant messaging including text, audio, video, images, and documents.

VOIP is a telecommunication method for transmitting voice communications over a data network, such as the Internet. Common VOIP implementations are in telephony where telephone conversations are partly carried over the Internet from a caller telephone to a called telephone. A VOIP call is a voice call connected using VOIP technology. VOIP data is the data that represents the voice signals in a voice call that is connected through VOIP systems.

Data networks are broadly categorized into two categories—local area network (LAN) and wide area network (WAN). A LAN is a data network that connects a few data processing systems, generally within a home or an office. A WAN is a data network that connects several LANs and data processing systems together, generally across cities, countries, and continents. The Internet is an example of a WAN, whereas a home networking is an example of a LAN.

Various communication devices are capable of communicating with each other using a variety of networks. Some communication devices are able to communicate over PSTN, other communication devices communicate over wired or wireless LANs and WANs, such as a VOIP enabled telephone. Presently, a communication device capable of communicating on one type of network may be able to communicate with another communication device capable of communicating on another type of network, by using intermediate data processing systems for connecting the communication devices operating on dissimilar networks. These intermediate data processing systems are commonly known as gateways, and they bridge different types of networks in the path from a caller communication device to a called communication device.

SUMMARY

To reduce the cost and complexity of network based gateways and data processing presently needed for connecting calls originating and terminating on different types of networks, the illustrative embodiments provide a method, system, and computer usable program product for facilitating a selection of a telecommunication network. In one embodiment, a request for a type of network associated with a called identifier is received from a calling communication device. A repository of information about caller identifiers is searched. Information corresponding to the called identifier is selected to form selected information. The selected information may include network information, such as a type of network, associated with the called identifier. The selected information is returned to the calling communication device in response to the request.

In another embodiment, the calling communication device, a user associated with the calling communication device, or both may be authenticated. Searching the repository, selecting the selected information, and returning the selected information is performed if the authenticating is successful. The authentication uses authenticating information about several users and several communication devices capable of sending the request. The authenticating information may also be managed in the repository.

In another embodiment, a cache may also be searched in addition to or instead of searching the repository. When a cache is present and information in the cache is present, a determination is made as to whether the called identifier in the request is available in the cache. If the called identifier in the request is available in the cache, the information corresponding to the called identifier in the cache is selected and returned.

In another embodiment, the selected information may further include a qualifier indicating a type of a telecommunication use, such as voice use, fax use, or data use, associated with the type of the network. In another embodiment, the request for the type of network associated with the called identifier may be a request for several types of networks associated with the called identifier. In another embodiment, the request for the several types of networks associated with the called identifier may be a request for the several types of networks associated with each of several called identifiers. The called identifier may be a called telephone number.

In another embodiment of a method, system, and computer usable program product for facilitating a selection of a telecommunication network information about several called identifiers is managed in a repository. The information about a called identifier includes a type of network that enables telecommunication using the called identifier. The information about the called identifier may be sent to a calling communication device such that a call from the calling communication device to the called identifier is placed using the network information, such as a type of network identified in the information. The information in the repository is updated by adding information about new called identifiers, updating information about the several called identifiers existing in the repository, or both.

In another embodiment, the updating may be done using data received from a source without requesting the data, using data received from the source in response to a request for the data, or both. Receiving the data from the source in response to the request includes selecting the source from a source list, constructing the request for the data such that the request is constructed in accordance with a specification acceptable to the selected source, sending the request to the selected source, and receiving, in response to the request, the data from the source. The received data may be processed such that the processed data is configured in accordance with a specification of the repository.

In another embodiment, the information about the caller identifier may include several types of networks. Additionally, the information about the called identifier may further include several qualifiers, each qualifier associated with a corresponding type of network and each qualifier indicating a type of a telecommunication use, such as voice use, fax use, or data use, associated with the corresponding type of the network. The called identifier may be a called telephone number.

BRIEF DESCRIPTION OF THE DRAWINGS

The novel features believed characteristic of the illustrative embodiments are set forth in the appended claims. The illustrative embodiments, however, as well as a preferred mode of use, will best be understood by reference to the following detailed description of an illustrative embodiment when read in conjunction with the accompanying drawings, wherein:

DETAILED DESCRIPTION OF THE DRAWINGS

The present disclosure incorporates simultaneously filed application Ser. No. 11/904,698, filed on Sep. 28, 2007, which is incorporated herein by reference.

Communication networks, or simply "networks", have several types of information associated with them. Such information pertaining to a network is called network information. Network information may include a type of the network such as telephone network of PSTN type, and data network capable of VOIP services. Other network information may be the protocol supported on the network speed of the network, operating times of the network, authentication requirements of the network and any other information that is useful in describing a characteristic of the network.

Presently, communication devices that can connect to more than one networks are available. For example, a telephone that can connect to PSTN as well as VOIP networks are currently available. However, a user using such a communication device determines which network to use when making a call. For example, a user may set the telephone to use VOIP network for voice communications and PSTN for fax calls.

Furthermore, when a call is made from a communication device on one network to a called communication device on another network, present systems employ a series of gateways and other data processing systems to connect calls on dissimilar networks. For example, a VOIP call originating from a VOIP enabled telephone and terminating at a PSTN called telephone goes through a series of gateways that bridge the VOIP network and PSTN.

Illustrative embodiments recognize that these gateways, and the data processing performed by these gateways are expensive, time consuming, and complex systems. The illustrative embodiments further recognize that calls originating and terminating on the same type of network are much more efficient and easier to manage as compared to calls originating and terminating on different types of networks.

Therefore, the illustrative embodiments recognize that information about the network supporting a called communication device can be provided to communication devices that are capable of connecting to more than one network as described below. Based on this provided information, a caller communication device may select a network such that the caller communication device and the called communication device may communicate on the same or similar networks. For example, a server may provide the information that a called telephone is capable of communicating on PSTN. Receiving this information from the server as described below, a caller telephone capable of connecting to a VOIP network and PSTN may select PSTN to match the network that a called telephone may be using. Selecting a network in this exemplary manner may reduce network resources used for the communication.

As another example, the server may provide information that a called number is supported on a VOIP network. A cellular phone capable of connecting to cellular network as well as VOIP network may receive and use this information to select the VOIP network to match the type of network supporting the called number. Many other combinations and configurations will become apparent from the description of the illustrative embodiments provided below.

Figure 1:
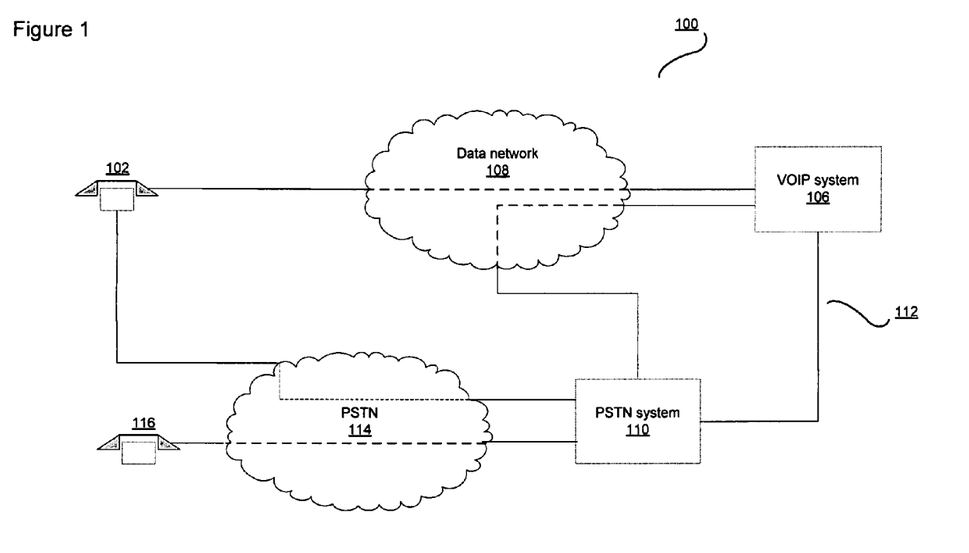
FIG. 1 depicts a block diagram of a telecommunication system in which illustrative embodiments may be implemented.

With reference to the figures, and in particular with reference to FIG. 1, exemplary diagrams of data processing environments are provided in which illustrative embodiments may be implemented. FIG. 1 is not intended to assert or imply any limitation with regard to the environments in which different embodiments may be implemented. Many modifications to the depicted environments may be made.

FIG. 1 depicts a block diagram of a telecommunication system in which illustrative embodiments may be implemented. A telecommunication system 100 includes a phone 102 that connects to more than one networks. A phone is a communication device. In one embodiment, phone 102 may be a familiar telephone equipment commonly used in homes. In another embodiment, phone 102 may be a software application, such as a softphone application, running on a data processing system, such as a voice-enabled application running on a computer. In other embodiments, phone 102 may be any other device, system, subsystem, application, or a combination thereof suitable for voice communications. Note that other communication devices, such as wireless portable computers, may also be used for communications using the illustrative embodiments.

A VOIP adapter (not shown) is an electronic device that can connect to phone 102, and convert the voice signals to and from phone 102 into data that can be processed for connecting a VOIP call. In one embodiment, phone 102 and VOIP adapter may be combined into one integrated device, forming phone 102.

A VOIP system 106 is representative of the entire VOIP system that a VOIP provider uses for providing VOIP services. VOIP system 106 may include a VOIP gateway and many other equipments, all of which together enable a VOIP provider to provide VOIP services. Phone 102 communicates with VOIP system 106 over a data network 108. Data network 108 is a VOIP network as described above. An example of data network 108 is the Internet.

For completing VOIP calls, such as a VOIP call originating from phone 102, VOIP system 106 communicates with providers of regular telephone services, such as PSTN providers, as well as other VOIP providers. FIG. 1 depicts VOIP system 106 in communication with a PSTN provider's PSTN system 110. VOIP system 106 may communicate with PSTN system 110 using a dedicated communication link 112, or using Public data network 108. PSTN provider's system 110 uses a PSTN network 114 for completing the call that originated as a VOIP call from phone 102 to a phone 116. Phone 116 is also a communication device as described above with respect to phone 102. A dedicated communication link such as dedicated communication link 112, is a telecommunication link configured for enabling communication only between predetermined parties.

Likewise, a call originating from phone 116 can be completed at phone 102 by traversing VOIP system 100 in order from phone 116 to phone 102. FIG. 1 depicts only schematic components involved in telecommunication system 100. Several other components, devices, systems, and interconnects may be present in a typical VOIP system but are not shown in FIG. 1 for clarity of the description.

Figure 2:
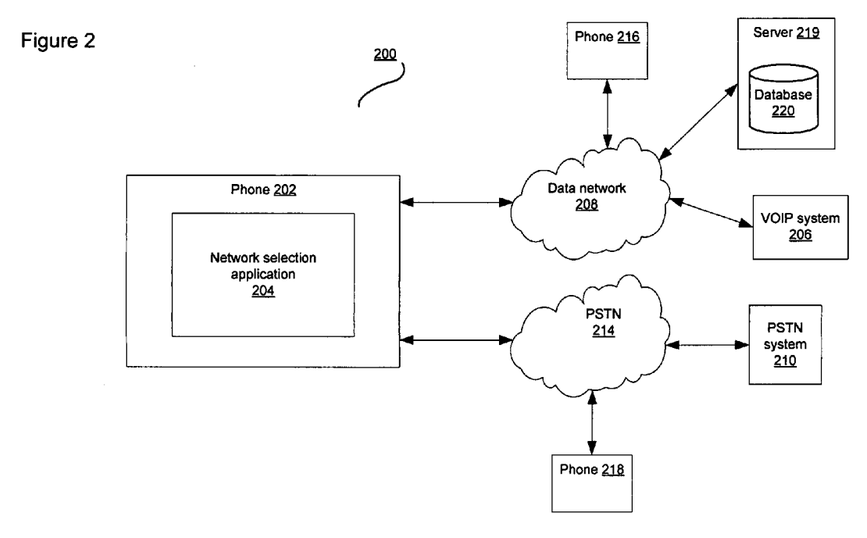
FIG. 2 depicts a block diagram of a system for providing information for selecting a communication network in accordance with an illustrative embodiment.

With reference to FIG. 2, this figure depicts a block diagram of a system for providing information for selecting a communication network in accordance with an illustrative embodiment. System 200 may be implemented using telecommunication system 100 in FIG. 1. Phone 202 may be implemented using phone 102 in FIG. 1.

Phone 202 includes network selection application 204. Phone 202 may communicate with VOIP system 206 over data network 208 in the manner described above with respect to FIG. 1. Phone 202 may also communicate with PSTN system 210 over PSTN 214, as described above with respect to FIG. 1. Other phones may also communicate with data network 208, PSTN 214, or both. For example, VOIP enabled phone 216 is shown as being in communication with data network 208, whereas PSTN phone 218 is shown to be in communication with PSTN 214. Phone 202 may call phones 216 and 218, and other similarly situated phones.

Network selection application 204 interacts with server 219 over data network 208. Server 219 is a data processing system and includes database 220, to which the interaction is directed. This interaction helps in the selection of either data network 208 or PSTN 214 for making a call from phone 202. The manner of network selection application 204's interaction with database 220, and the manner of selection of network for communication between phone 202 and exemplary phones 216 and 218, is described in detail in the description of subsequent figures below. A detailed description of server 219 and components thereof is also provided in the description of subsequent figures below.

Figure 3:
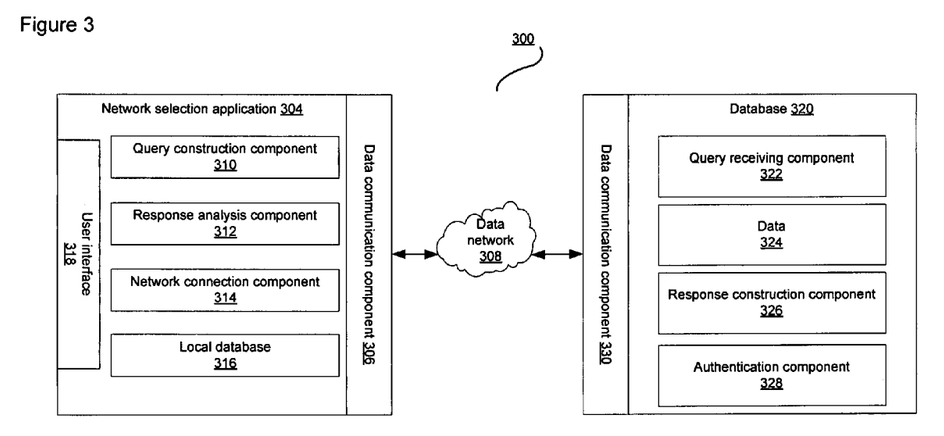
FIG. 3 depicts a block diagram of a network selection system in accordance with an illustrative embodiment.

With reference to FIG. 3, this figure depicts a block diagram of a network selection system in accordance with an illustrative embodiment. Network selection system 300 includes network selection application 304, which may be implemented using network selection application 204 in FIG. 2.

Network selection application 304 uses data communication component 306 for communicating with data network 308. Data network 308 may be implemented using data network 208 in FIG. 2. Network selection application 304 includes query construction component 310, response analysis component 312, network selection component 314, local database 316, and user interface 318.

Network selection system 300 includes database 320, which may be implemented using database 220 in server 219 in FIG. 2. Server 219 is accessible over data network 208. Database 320 is a repository for data and may take the form of a relational database, an object oriented database, an index file, a flat file or any other form suitable for storing data. The illustrative embodiments describe database 320 as a database of some kind only as exemplary without limiting the illustrative embodiments to databases.

Database 320 is a remote database. A remote databases is a database that is accessed over a data network. Database 320 includes query receiving component 322, data 324, response construction component 326, and optional authentication component 328. Database 320 uses data communication component 330 for communicating with data network 308. Database 320 may further have a specification such as a schema, a data definition, or other similar data specification for storing data therein.

When a user dials a called number on a caller phone, such as phone 202 in FIG. 2, network selection application 304 receives the called number. Using the called number, query construction component 310 constructs a query for database 320 to determine a network information about a network, such as a type of network, on which the called number operates. A query is a request for information. Note that the user may be a human user of the caller phone, or an application, such as a software application, making a call.

In one embodiment before constructing a query for database 320, query construction component 310 may query local database 316. Local database 316 may include information similar to the information provided by database 320, but for certain called numbers that are called frequently or are provided by the user of the caller phone. Local database 316 may also learn, and store the learned information for future use, from the results of previous queries sent to database 320.

By querying local database 316 first querying database 320 may be avoided if information about the called number is present in local database 316. Avoiding querying database 320 may reduce the total time needed for connecting the call in accordance with the illustrative embodiment, as queries to local databases are generally faster than queries to remote databases.

In another embodiment, both databases—local database 316 and remote database 320—may be queried. As an example, an implementation of the illustrative embodiment may choose to query both databases for verifying the accuracy of the information in either database, or for updating the information in either database.

Another embodiment may query the remote database, database 320, before querying the local database 316. As an example, this order of querying may be useful if the local database is non-responsive for any reason. Continuing with the description of components of network selection application 304, response analysis component 312 receives and analyzes the response to the query sent by query construction component 310. The response may be a response to a query sent to local database 316 or a response to a query sent to database 320. Response from database 320 may be received using data communication component 306.

By analyzing the response, response analysis component 312 identifies a network that may be used for connecting the call to the called number. Network connection component 314 may use the identified network and completes the call to the called number on the identified network.

In some circumstances, the identified network may not be acceptable to the user originating the call. In such circumstances, the user may wish to override the selection of the identified network and select a different network for completing the call. User interface 318 provides the user the capability for specifying the overriding instructions, for example, for specifying which network to use instead of the identified network.

User interface 318 may take any form suitable for the communication device being used for making the call. For example, when the communication device is a telephone, user interface 318 may be the keypad of the telephone. As another example, when the communication device is a softphone, user interface 318 may be a graphical user interface displayed on a computer monitor. User interface 318 may also be simply a function, an application programming interface (API), or an equivalent thereof, which can be called by an application placing the call, or network selection application 304, such as in the case when a call fails on the identified network and an alternate network has to be selected. Many other ways of implementing user interface 318 will become apparent from this disclosure.

When a query is sent to database 320, network selection application 304 uses data communication component 306 for communicating with database 320 over data network 308. Similarly, database 320 uses data communication component 330 for communicating with data network 308. Database 320 receives a query sent to database 320, through data communication component 330, using query receiving component 322. Query receiving component 322 may perform other functions in addition to receiving the query. For example, query receiving component 322 may perform pre-processing of the query, such as optimizing the query, reforming the query, scheduling the query for execution, and logging the query. Many other query pre-processing functions will be conceivable from the description of the illustrative embodiment.

Furthermore, query receiving component 322 may authenticate the user and/or the communication device that sent the query. For authenticating, query receiving component 322 may use authentication component 328.

In one embodiment, authentication may be an optional function and authentication component 328 may be an optional component. In another embodiment, authentication may be a task external to database 320, and authentication component 328 may be external to database 320. In yet another embodiment, authentication may be an implicit function of query receiving component 322, and authentication component 328 may be merged with query receiving component 322. Many other configurations are conceivable from this description of the illustrative embodiment.

Once a query is received and optionally pre-processed, and optional authentication performed, the query is submitted for searching data 324. Data 324 includes at least a listing of several phone numbers and their corresponding networks. For example, data 324 may include a telephone number 212-555-1212 and an indication that the telephone number operates on PSTN, and a telephone number 212-555-1313 and an indication that the telephone number operates on VOIP network.

Data 324 may include many other pieces of information, or attributes, about the telephone numbers or users stored therein. For example, data 324 may include not only telephone numbers, but wireless numbers, user identifier (user ID), short message service (SMS) numbers, instant messaging (IM) identifiers, email addresses, Internet protocol (IP) addresses, street addresses, global positioning system (GPS) locations, device capabilities, and other similar attributes associated with a caller/called party, and a caller/called communication device. Furthermore, data 324, and database 320 as a whole, may be distributed across several data processing systems, organized and interconnected with each other in some logical fashion.

In one embodiment, the telephone number itself may provide an indication of the network on which a communication device associated with that telephone number is supported. For example, a telephone number having a particular area code may be indicative of a particular carrier's network and the network's type by implication, such as PSTN. In another embodiment, another type of identifier, such as a user ID, may indicate the type of network supporting the called communication device. For example, a call to a user ID instead of a conventional telephone number may indicate that the called communication device is supported on a data network such as a VOIP network. Similarly, other identifiers for a called party may indicate the type of network supporting a called communication device, and are contemplated within the scope of the illustrative embodiments. Any identifier, including the examples provided above, that identifies a called party, is called a called identifier. Similarly, any identifier, including the examples provided above, that identifies a calling party, is called a calling identifier.

Once the query is executed against data 324, response construction component 326 prepares the result of the query in a form that may be acceptable to network selection application 304. The prepared response is then sent from database 320 to network selection application 304 over data network 308, using data communication components 306 and 330.

The components depicted in FIG. 3 are depicted only as exemplary for the clarity of the description, and are not limiting on the illustrative embodiments. A particular implementation may organize the components differently than shown, may combine, subdivide, or augment the depicted components without departing from the scope or spirit of the illustrative embodiments.

Figure 4:
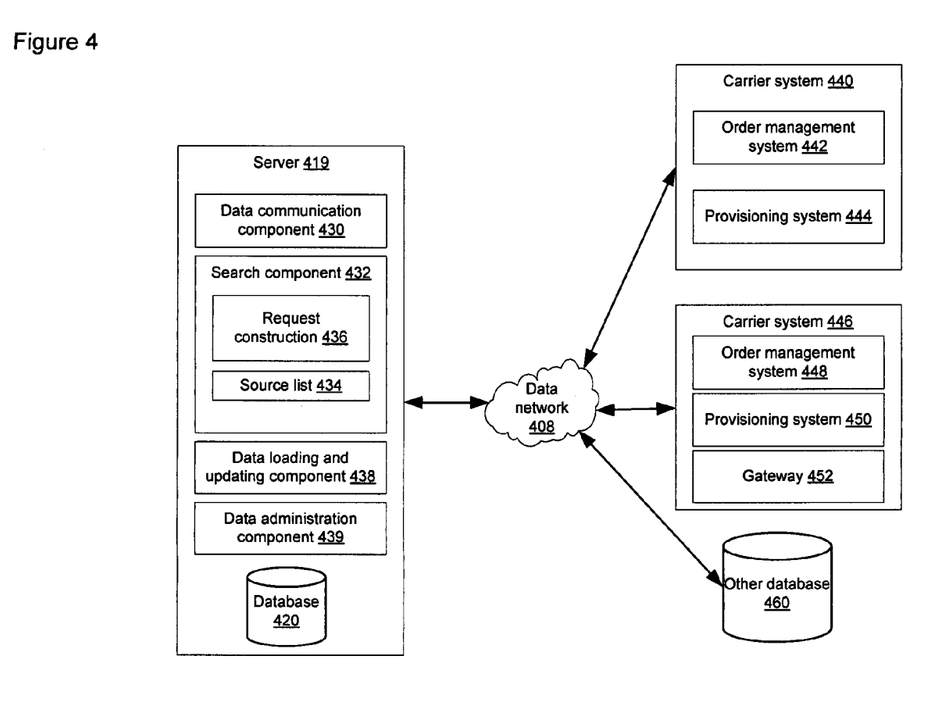
FIG. 4 depicts a block diagram of a system for providing information to facilitate selection of a telecommunication network in accordance with an illustrative embodiment.

With reference to FIG. 4, this figure depicts a block diagram of a system for providing information to facilitate selection of a telecommunication network in accordance with an illustrative embodiment. Data network 408 may be implemented using data network 208 in FIG. 2. Server 419 may be implemented using server 219 in FIG. 2.

Server 419 is a data processing system that includes database 420 that includes information for facilitating selection of a telecommunication network as described above. Database 420 may be implemented using database 320 in FIG. 3. Server 419 may include components 322, 324, 326, and 328 in FIG. 3 within database 420, or outside of database 420 but included in or accessible to server 419.

Furthermore, server 419 may be a single data processing system, or may be distributed across several data processing systems capable of interacting with each other. In a distributed data processing system serving as server 419, the various components described below may be located in different data processing systems. However, the behavior and functions of these components may be unaffected by the single data processing system or distributed data processing system implementation of server 419. Server 419 is described using a single data processing system illustration for the clarity of the description, and is not intended to be limiting on the illustrative embodiments.

As an example, database 420 may include information about several called numbers and their corresponding types of networks on which those called numbers are supported. A called number may be supported on PSTN. A corresponding information entry in database 420 may provide that called number and network information corresponding to the called number, such as an indication corresponding to that called number to show that the type of network supporting that called number is PSTN.

Alternatively, the network information may include information of a local switch or access point, instead of or in addition to the type of network indication. The network information may be used by the calling communication device to initiate communication with the switch or the access point. As described above, network information may include speed of the network, authentication requirements of a network, a network node address with or without identifying the type of the network, and any other information about a network that is useful in communicating with communication devices supported on that network.

Server 419 further includes data communication component 430. Data communication component 430 may be implemented using data communication component 330 in FIG. 3. Data communication component 430 provides server 419 the ability to exchange data with other systems and devices using data network 408. A component of server 419 may use data communication component 430 for similar purposes.

Server 419 may further include search component 432. Search component 432 provides server 419 the ability to request and receive data from other sources. Server 419 may request and receive data, such as called numbers and their corresponding types of networks, from other sources. Other sources of this type of data may be the carrier that provides telephone service to a called number, a database of marketing information, or other sources of similar information.

The data may include other pieces of information as well. For example, a second type of network may be provided together with a date or time when the first type of network becomes inactive and the second type of network becomes active. For example, a data network may have a scheduled maintenance planned on a certain date and time when the data network may become inactive. As another example, a user may have planned a switchover from PSTN to VOIP services on a certain date when the PSTN network for that user's called number may become inactive. As another example, a corporate phone system on PSTN may go off-line after business hours and switch to VOIP services over a data network that may be active 24 hours a day.

As another example, a called number may accept both voice and fax communications. For such a called number, two types of networks may be provided in the data along with qualifiers for each type of network. According to this example, the data may contain the called number, a first type of network such as VOIP, with a qualifier "voice" or equivalent to indicate that VOIP is to be used for voice communication with that called number. The data may also include a second type of network, such as PSTN, with a qualifier "fax" to indicate that PSTN is to be used for fax communication with that called number. These examples are not intended to be limiting on the illustrative embodiments. Many other pieces of information will be conceivable from these examples, and may be included in the data requested, received, processed, and stored in server 419 or its various components.

Referencing search component 432 again, search component 432 may include a source list 434, request construction component 436, and other implementation specific components. Source list 434 is a list of sources of data, such as the exemplary data described above, with which server 419 may interact for requesting and receiving data. A source may proactively send data to server 419, without server 419 having to request data from that source. Furthermore, a source need not be in source list 434 in order to send data to server 419.

A source in source list 434 may specify a particular format or contents of the requests directed towards that source. Some request specifications may be common between several sources, and it is possible to have a unique request format for each source in source list 434. Request construction component 436 constructs a request for data from a source in source list 434 depending on a request specification for that source. Request specifications may be stored in source list 434, request construction component 436, or another repository, such as a database, an extensible markup language (XML) document, a flat file, or other structure suitable for the purpose.

Data loading and updating component 438 loads or updates the data into database 420. For example, when a source provides data to server 419, data loading and updating component 438 may process that data, such as converting to a format acceptable to database 420. Data loading and updating component 438 may then load the processed data if the data does not exist in database 420, or update existing data, such as data 324 in FIG. 3, in database 420 using the new data.

Data administration component 439 facilitates the administration of data in database 420. For example, a database administrator may be able to reorganize, reconcile, or manipulate the data in database 420 using data administration component 439.

Carrier system 440 is an example of a source of data as described above. Carrier system 440 may be one or more systems used by a carrier providing the telephone service to a called number. Carrier system 440 may include other systems, such as order management system 442 and provisioning system 444. The data provided by carrier system 440 to server 419 may reside in order management system 442, provisioning system 444, or another system accessible to carrier system 440.

Carrier system 446 is another example of a source of data as described above. Carrier system 446 may be similar to carrier system 440 and may include one or more systems used by a carrier providing the telephone service to a called number. For example, if carrier system 446 represents the systems of a VOIP service provider, carrier system 446 may include other systems, such as order management system 448, provisioning system 450, and gateway 452. The data provided by carrier system 446 to server 419 may reside in order management system 448, provisioning system 450, and gateway 452, or another system accessible to carrier system 446.

Database 460 is another example of a source of data as described above. For example, database 460 may be a marketing database used for marketing VOIP services to PSTN telephone users. As another example, database 460 may be a sales database used for selling additional services to users of some PSTN services.

Carrier systems 440 and 446, and database 460 are described only as exemplary and are not intended to be limiting on the illustrative embodiments. Any source that can provide data exemplarity described above may be used in place of any of carrier systems 440 and 446, and database 460 without departing from the scope or spirit of the illustrative embodiments.

In certain implementations, server 419 may be a part of a carrier system, such as carrier system 440. In such an implementation, the carrier in control of the carrier system including server 419 may choose to provide the services of server 419 to only the carrier's customers or any customer regardless of who provides services to that customer. In another implementation, server 419 may be operated by an entity that is not a carrier. Such an entity may choose to provide the services of server 419 to only a particular carrier's customers, any customer regardless of who provides services to that customer, customers having specific communication devices, such as those manufactured by a specific manufacturer, or customers with other commonalties.

Figure 5:
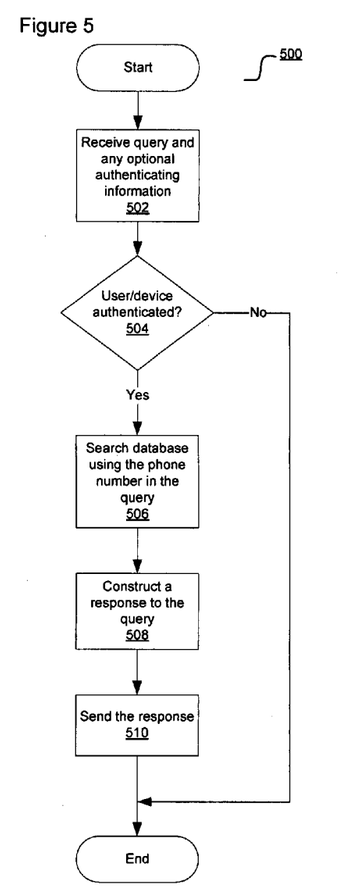
FIG. 5 depicts a flowchart of a process of responding to a request from a network selection application in accordance with an illustrative embodiment.

With reference to FIG. 5, this figure depicts a flowchart of a process of responding to a request from a network selection application in accordance with an illustrative embodiment. Process 500 may be implemented using server 419 in FIG. 4.

Process 500 begins by receiving a query and any optional authenticating information, such as those sent from network selection application 304 in FIG. 3 (step 502). A database, such as database 320 in FIG. 3, may perform authentication of the requesting device or user, and such authentication may be optional in some implementations of process 500. If authentication is performed, and authenticating information is received in step 502, process 500 determines if the requesting user and/or device have been authenticated (step 504). If the user and/or the device have been authenticated ("Yes" path of step 504), the process searches the database using the phone number supplied in the query (step 506). The process may search a database, such as databases 320 in FIG. 3, using the database's data, such as data 324 in FIG. 3, for performing step 506.

Based on the result of the search performed in step 506, the process constructs a response to the query received in step 502 (step 508). The process then sends the response to the requesting user and/or device that sent the query received in step 502 (step 510). The process ends thereafter.

Returning to step 504, a requesting user and/or device may fail authentication. If the requesting user and/or device are not authenticated ("No" path of step 504), the process ends.

Figure 6:
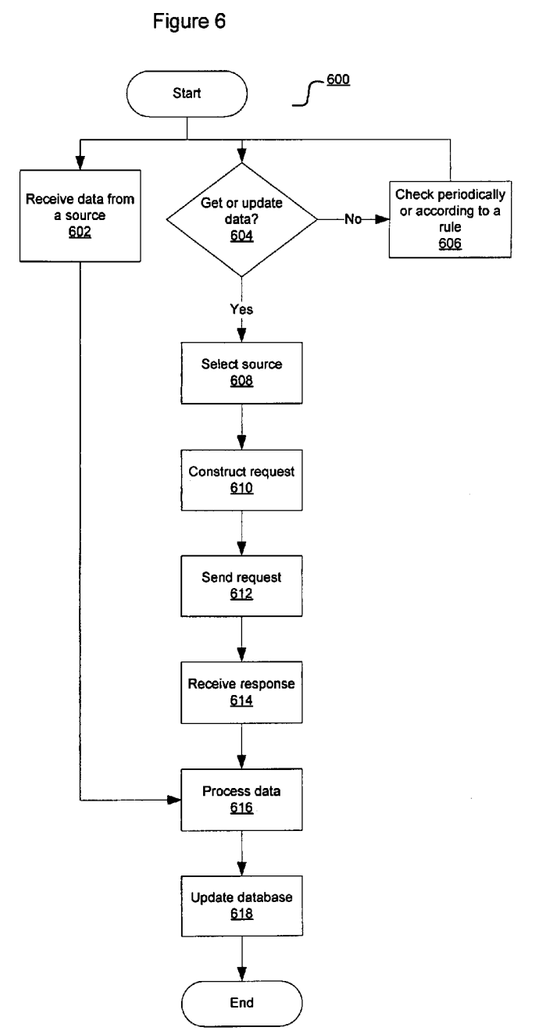
FIG. 6 depicts a flowchart of a process of receiving data that facilitates selection of telecommunication networks in accordance with an illustrative embodiment.

With reference to FIG. 6, this figure depicts a flowchart of a process of receiving data that facilitates selection of telecommunication networks in accordance with an illustrative embodiment. Process 600 may be implemented using server 419 in FIG. 4.

Process 600 may begin in at least two manners, or a combination of the two manners. In a first manner, process 600 begins by receiving data from a source (step 602). The received data may be as described in the description of FIG. 4 above. A source may be as described in the description of FIG. 4 above.

In an alternate manner, process 600 may begin by determining if the process should get or update data (step 604). The determination whether to get or update data is a determination of whether to get new data, get new data to update old data, or a combination thereof.

If the process determines not to get or update data ("No" path of step 604), the process checks whether to get or update data periodically or according to a rule (step 606). As an example, step 606 may check the determination of step 604 again periodically, such as by the expiration of a timer or at a set frequency. As another example, step 606 may check the determination of step 604 again based on a rule, such as when an event occurs. An example of an event may be an error condition in the database, a manual trigger for an update, or other events according to a specific implementation. Rules may be created for step 606 and other operations, such as operations in server 419 in FIG. 4. An engine for creating, executing, and managing those rules may be a part of server 419 in FIG. 4.

Returning to step 604, if the process determines that data should be got or updated ("Yes" path of step 604), the process selects a source (step 608). The process may select one or more sources in step 608.

The process constructs a request for data for each source selected in step 608 (step 610). The request may be constructed using request specification for each source as described above. The process then sends the request to the source (step 612). The process receives a response to the request of step 612 (step 614). The process may receive one or more responses corresponding to a request. Furthermore, a response may include the requested data, may be followed by subsequent a response that includes the requested data, or may not include any data at all, such as in the case when no data is available at the source or when the source refuses the request.

If data is received in the response received in step 614, the process processes the data (step 618). As an example, the processing may alter the format of the data according to the specifications of the database, such as database 420 in FIG. 4. As another example, the processing may combine several pieces of the received data among themselves or with other pieces of data, such as pre-existing data. Any processing of the received data according to a particular implementation of the illustrative embodiments may be performed in step 616 without departing from the scope or spirit of the illustrative embodiments.

The process then updates the database with the processed data of step 616 (step 618). The process ends thereafter. The updating the database in step 618 may include adding new data to the database, updating old data in the database with new data, or a combination thereof.

Note that the steps of processes 500 and 600 are selected and described only for clarity of the description and are not limiting on the illustrative embodiments. Depicted steps may be combined, further divided, augmented to, deleted, or modified in particular implementations.

Furthermore, the various illustrative embodiments are described using called number for selecting a network only for the clarity of the description. Called numbers are used only as exemplary and are not limiting on the illustrative embodiments. Any called identifier, as described above, may be used in place of a called number in the manner described in an implementation of the illustrative embodiments.

Thus, in the illustrative embodiments described above, a computer implemented method, apparatus, and computer program product provide for facilitating the selection of a telecommunication network. The illustrative embodiments describe an improved telecommunication system where a server based process and information may facilitate selecting one of many accessible networks for connecting a call. The server based process and information may facilitate selecting one of many accessible networks in a communication device used for making the call.

In one embodiment, the selection of the network is based on learning from the server based process and information, the network on which a called number is supported. Selecting at the caller communication device for connecting a call, a network that supports the called number, may avoid using network-based gateways and data processing that is presently required for connecting calls to and from dissimilar networks. Thus, connecting a call using a network that is common to both the calling number and the called number using the illustrative embodiments may be more efficient, cheaper, and easier, than connecting a call that originates on one type of network and terminates on another type of network.

In one embodiment of the server, such as server 419 in FIG. 4, the server may include a cache in addition to the database. The cache may be used for storing frequently used information. For example, information about a called number, whose associated type of network is frequently requested, may be stored in a cache to expedite the response to a subsequent request for that information. In such an embodiment, a rule may be executed by the rules based engine described above that prompts the server to check whether the information about the called number in a request is available in the cache before the information in the database is searched.

In another embodiment, the server, such as server 419 in FIG. 4, may receive requests from a calling communication device where the request is for multiple types of networks that may be associated with a called identifier. A calling communication device may send this type of request for a number of reasons. For example, a calling communication device, and the network selection application therein, may send such a request for updating its local database. As another example, a calling communication device, and the network selection application therein, may send such a request for learning all the various networks that service a called identifier in order to make several telecommunication calls of different types, such as a voice call, a fax call, a data call, or a video call. Each type of telecommunication call exemplified above as well as other types of calls, is a type of telecommunication use. Many other types of telecommunication uses are conceivable from the above description.

In another embodiment, the server may receive requests from a calling communication device where the request is for multiple types of networks that may be associated with several called identifiers. A calling communication device may send this type of request for a number of reasons. For example, a calling communication device, and the network selection application therein, may send such a request for updating its local database. As another example, a calling communication device, and the network selection application therein, may send such a request for temporarily caching the requested information for use in a series of calls that are planned or scheduled from the calling communication device. Many other uses are conceivable from the above description of these types of requests.

The illustrative embodiments can take the form of an entirely hardware embodiment, an entirely software embodiment or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communication link. This communication link may use a medium that is, for example without limitation, physical or wireless.

The above description has been presented for purposes of illustration and description, and is not intended to be exhaustive or limited to the illustrative embodiments in the form disclosed. Many modifications and variations will be apparent to those of ordinary skill in the art.

What is claimed:

1. A method for facilitating a selection of a telecommunication network over which to initiate a communication, the method comprising:
    receiving at a first communication device a user-input that includes a call identifier associated with a second communication device;
    querying, by the first communication device, locally stored data on the first communication device for network information associated with the call identifier, wherein the network information includes at least one type of network that the communication device associated with the call identifier is operable to receive a call;
    responsive to a determination by the first communication device that the network information associated with the call identifier is located in the locally stored data of the first communication device, retrieving by the first communication device the network information associated with the call identifier from the locally stored data of the first communication device;
    responsive to a determination by the first communication device that the network information associated with the call identifier is not located in the locally stored data of the first communication device, transmitting, by the first communication device, a query to a network database for the network information associated with the call identifier;
    authenticating by the network database at least one of the first communication device and an end-user associated with the first communication device prior to performing the query on the network database, wherein the authenticating uses authenticating information about a plurality of users capable of sending the query and authenticating information about a plurality of end-user communication devices capable of sending the query;
    performing the query on the network database in response to the at least one of the first communication device and the end-user associated with the first communication device being authenticated, and receiving by the first communication device the network information associated with the call identifier from the network database in response to the network information being found on the network database; and
    utilizing by the first communication device the network information to select a network for establishing communications with the second communication device.

2. The method of claim 1, further comprising:
    responsive to retrieving the network information associated with the call identifier from the locally stored data of the first communication device, querying the network database for the network information associated with the call identifier, performing a comparison of the network information from the locally stored data of the first communication device with the network information associated with the call identifier from the network database, and updating at least one of the network information from the locally stored data of the first communication device and the network information associated with the call identifier from the network database based on a result of the comparison indicating that the at least one of the network information from the locally stored data of the first communication device and the network information associated with the call identifier from the network database is outdated.

3. The method of claim 1, wherein the locally stored data of the first communication device stores the network information for frequently called call identifiers.

4. The method of claim 1, further comprising updating the locally stored data of the first communication device with the network information associated with the call identifier received from the network database.

5. A system for facilitating a selection of a telecommunication network over which to initiate a communication, the system comprising:
　a user input component configured to receive a call identifier associated with a communication device;
　a processor for executing instructions to:
　　query for network information associated with the call identifier from locally stored data, the network information includes at least one type of network associated with the call identifier;
　　retrieve the network information associated with the call identifier from the locally stored data of the system in response to a determination that the network information associated with the call identifier is located in the locally stored data of the system;
　　responsive to a determination that the network information associated with the call identifier is not located in the locally stored data of the system, send a query to a network database for the network information associated with the call identifier, wherein the network database is configured to authenticate, prior to preforming the query, at least one of the system and a user associated with the system using authenticating information about a plurality of users capable of sending the query and authenticating information about a plurality of communication devices capable of sending the query;
　　responsive to the at least one of the system and the user associated with the system being authenticated, receive the network information associated with the call identifier from the network database in response to the network information being found on the network database; and
　　utilize, by the system, the network information to select a network for establishing communications with the communication device.

6. The system of claim 5, wherein the network database manages the authenticating information.

7. The system of claim 5, wherein the network information includes a type of network.

8. The system of claim 7, wherein the network information further includes a qualifier indicating a type of a telecommunication use associated with the type of the network.

9. The system of claim 7, wherein the query for the network information associated with the call identifier is a request for a second plurality of network information associated with the call identifier.

10. The system of claim 9, wherein the request for the second plurality of network information associated with the call identifier is a request for the second plurality of network information associated with a second plurality of call identifiers.

11. The system of claim 10, wherein processor further executes instructions to query the network database for the network information associated with the call identifier in response to retrieving the network information associated with the call identifier from the locally stored data of the system, perform a comparison of the network information from the locally stored data of the system with the network information associated with the call identifier from the network database, and update at least one of the network information from the locally stored data of the system and the network information associated with the call identifier from the network database based on a result of the comparison indicating that the at least one of the network information from the locally stored data of the system and the network information associated with the call identifier from the network database is outdated.

* * * * *